Dec. 9, 1969  A. G. BUTSCH  3,482,893
WALL MOUNTING FOR ELECTRIC APPLIANCES
Filed Jan. 30, 1968  2 Sheets-Sheet 1

INVENTOR.
Alfred G. Butsch
BY
*McGrew Edwards*
ATTORNEYS

Dec. 9, 1969  A. G. BUTSCH  3,482,893
WALL MOUNTING FOR ELECTRIC APPLIANCES
Filed Jan. 30, 1968  2 Sheets-Sheet 2

INVENTOR.
Alfred G. Butsch
BY
ATTORNEYS

United States Patent Office 3,482,893
Patented Dec. 9, 1969

3,482,893
WALL MOUNTING FOR ELECTRIC APPLIANCES
Alfred G. Butsch, 4414 Lincoln Road,
Louisville, Ky. 40220
Filed Jan. 30, 1968, Ser. No. 701,753
Int. Cl. A47f 5/08; B01f 7/16
U.S. Cl. 312—245                                6 Claims

ABSTRACT OF THE DISCLOSURE

A wall mounting base for an electric mixer or the like comprises a hollow shell arranged to be hung from a pivot on a wall. The shell is formed with an outer side sloping downwardly and outwardly from the pivot and enclosing side walls with the rear side open. Beaters or other accessories are mounted within the base and the mixer is pivotally mounted from a hanger at the upper end of the base and bears against the base to hold it in firm frictional engagement with the wall.

---

This invention relates to wall mounting devices for hand appliances such as electric mixers and particularly to an improved device for holding an electric mixer and its accessories in a secure but readily removable position on a wall.

Various arrangements have been provided heretofore for storing electric appliances such as food mixers during the periods when they are not in use. These arrangements include boxes, cabinets and racks of various kinds and also include provision for hanging the appliance on a wall or other structure. It is desirable that appliances such as mixers be readily available for use and that all necessary accessories such as the beaters also be readily available. Accordingly, it is an object of this invention to provide an improved wall mounting for an electric food mixer or the like.

It is another object of this invention to provide a wall mounting for an electric mixer or the like including an improved arrangement for making the mixer and its accessories all readily and conveniently available.

Briefly, in carrying out the objects of this invention in one embodiment thereof a wall mounting for an electric mixer is provided which comprises a hollow plastic shell having its rear side open and its front side relatively flat and sloping outwardly from the top toward the bottom. The shell is mounted on a wall on a projection such as a screw which holds the top end close to the wall. Near the top of the front side is a lug or pivot on which a mixer is suspended. In its suspended position the mixer engages and presses against a lower part of the front side and holds the shell firmly against the wall. Retaining clamps are provided for holding the mixer accessories within the hollow shell which may be placed on and removed from the wall with the accessories therein.

The features of novelty which characterize this invention are pointed out with particularity in the claims annexed to and forming a part of this specification. The invention itself, however, both as to its organization and manner of use, together with further objects and advantages thereof will be best understood upon reference to the following description taken in connection with the accompanying drawings in which:

Figure 1:
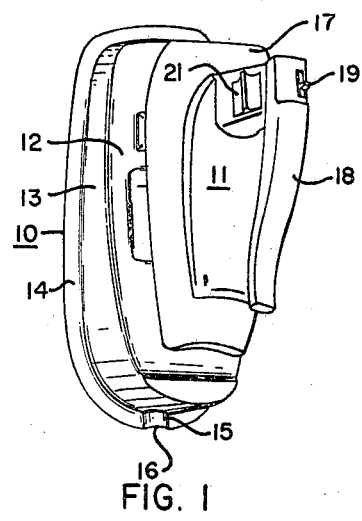
FIG. 1 is a perspective view of a wall mounting embodying the invention supported on a wall with an electric mixer in position thereon.

Referring now to the drawings, FIG. 1 illustrates a wall mounting base 10 embodying the invention in position as suspended from a wall with an electric mixer 11 supported thereon. The base as illustrated comprises a front wall 12, a side wall 13 and a flange 14 which extends about the mounting and contacts the flat surface of a wall. At the bottom end of the base a flange 14 is formed in a loop or bridge portion 15 which provides a finger hole 16 adjacent the wall to facilitate the gripping of the base when it is being removed from the wall. An electric mixer unit 11 as illustrated comprises a base or body member 17, a handle 18 with a motor control 19 thereon and also a thumb press member 21 for releasing the beaters (not shown) from the mixer. When the mixer 11 is mounted on the base 10 as illustrated the beaters are detached and stored within the base 10 which is hollow.

Figure 2:
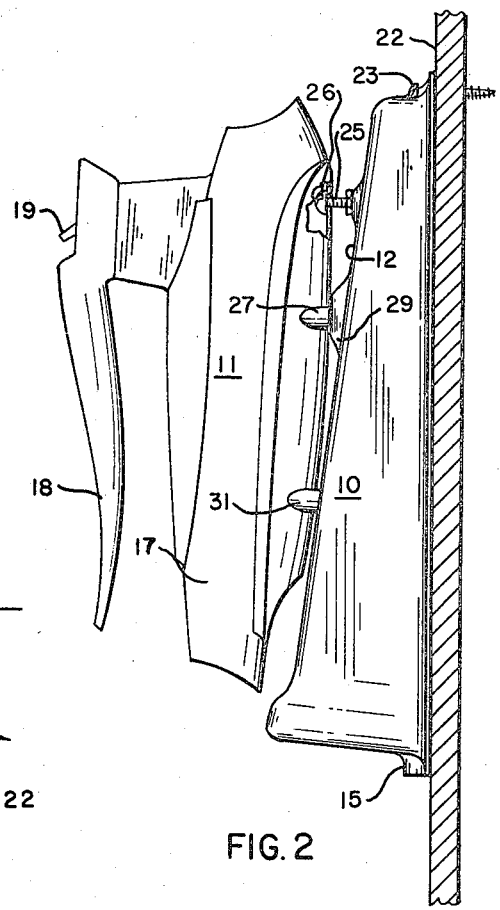
FIG. 2 is an enlarged side elevation view of the mounting and mixer illustrated in FIG. 1.
Figure 3:
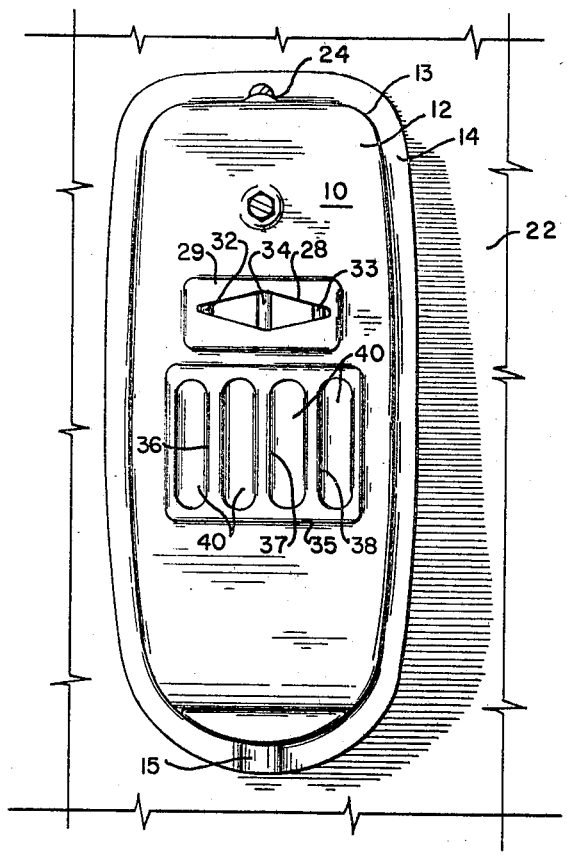
FIG. 3 is a front elevation view of the mounting illustrated in FIG. 2.

As shown in FIGS. 2 and 3, the base 10 is supported on a wall indicated at 22 by a screw 23 secured in the wall and having its head spaced slightly from the wall so that it may pass through an opening 24 in the top side wall 13 adjacent the flange 14. The base 10 is supported solely on the screw 23 and is thus free to be rotated laterally along the surface of the wall about the screw 23 as a pivot. This arrangement of a single pivot for supporting the base on the wall is provided in order to facilitate the ready attachment and removal of the base from its position on the wall. The mixer unit 11 is suspended from the base 10 on a bolt 25 which projects outwardly from the face 12 at a position centrally of the base and spaced below the hole 24. The head of the bolt 25 indicated at 26 fits through the usual key hole slot provided in the bottom plate of mixer units so that they may be hung on a screw or nail in a wall. The mixer is thus mounted on the bolt 25 and may be pivoted laterally thereon. The mixer 11 has been illustrated as having a foot 27 extending downwardly from the bottom thereof which is provided to support the mixer on a level surface. The foot 27 has been illustrated in position to pass through an opening 28 in the front face 12 of the mounting, this opening being formed in an embossment 29 of the material of the base on the top wall thereof.

As shown in FIG. 2, the side wall of the base 10 is of increasing depth from the top toward the bottom so that the cross section of the base member increases from the top to the bottom. When the mixer is suspended from the bolt 25 its center of gravity lies well in front of the face wall 12 and the mixer then pivots on the bolt 25 toward the wall 12 and a lower portion thereof indicated as a second rubber foot 31 rests against the surface 12. The weight of the mixer resting on the bolt 25 tends to pivot the mounting base 10 about the screw 23 against the wall 22 and the resting of the leg 31 of the mixer against the lower portion of the mounting base transfers a portion of the weight of the mixer laterally against this lower portion of the base and it will thus be apparent that the base is firmly pressed against the wall 22. A substantial portion of the rear side of the flange 14 is flat and arranged so that it rests against the flat wall. When the pressure between the base 10 and the wall is applied from the mixer unit mounted on the base the base is held in firm frictional engagement with the wall. When the screw 23 is positioned with its head spaced from the wall 22 a distance to hold the flange 14 close to the wall, engagement of the flange throughout the edge portion of the base seals the hollow interior of the base against the circulation of dust or the like.

Figure 4:
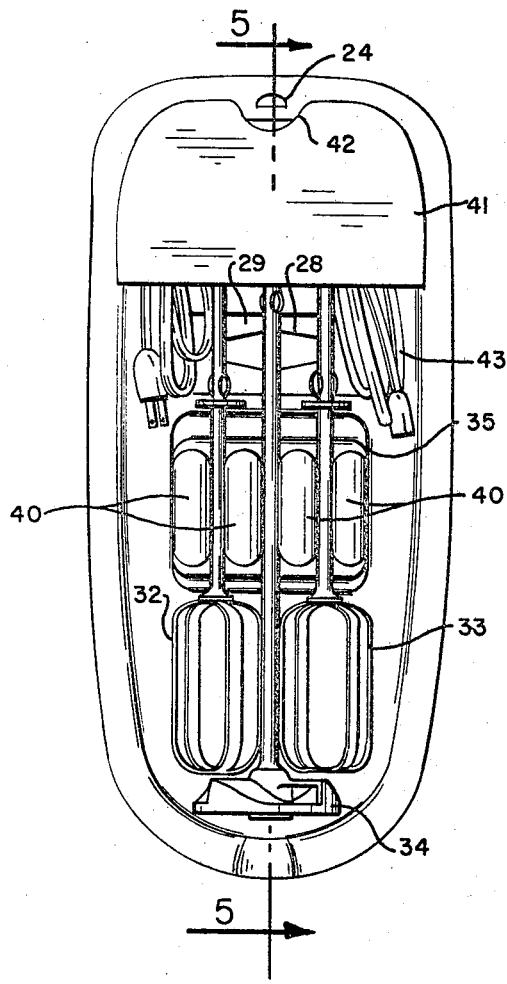
FIG. 4 is a rear elevation view of the mounting illustrated in FIG. 2.
Figure 5:
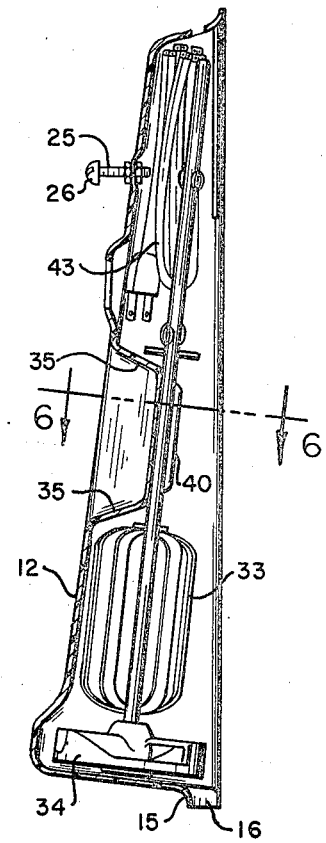
FIG. 5 is a sectional view taken along the lines 5—5 of FIG. 4.
Figure 6:
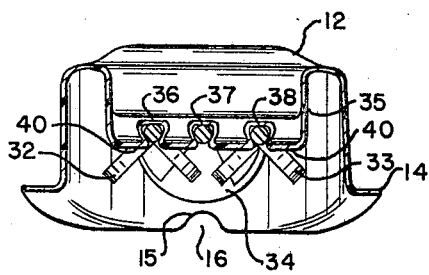
FIG. 6 is a sectional view taken along the lines 6—6 of FIG. 5.

The closed hollow interior of the base 10 is employed for storing essential accessories for the mixer, the arrangement for storing these parts being shown in FIGS. 4, 5 and 6. As shown in these figures, the dual beaters indicated at 32 and 33 and a single long stemmed beater 34 are mounted on a supporting projection 35 formed as a depressed portion of the front face 12. The beaters 32, 33 and 34 are positioned with their heads within the enlarged portion at the lower end of the base 10. The support 35 is provided with three grooves 36, 37 and 38 respectively which are formed between elongated enlargements 40 on the support 36. As indicated in FIG. 6 the grooves 36, 37 and 38 are somewhat tapered being smaller at their open ends so that the shafts of the beaters may be snapped into place and will be held in position by the resilience of the plastic material of which the base is constructed. The upper end of the hollow interior of the base is closed by a plate 41 which is provided with a recess 42 at the top to afford ready access to the hole 24 when mounting the base on the screw 23. Plate 41 encloses the upper end of the interior of the base and provides a convenient place for storage of the electrical extension cord indicated at 43 which has been shown bundled together and placed in position in the space below the plate 41 before the beaters 32, 33 and 34 have been snapped into their positions, with the upper ends of their shafts extending under the plate 41.

The base 10 is preferably constructed from a relatively light plastic material molded to the configuration shown. It will be apparent from the arrangement for suspending the base on the pivot 23 and a mixer unit on the pivot 25 and from the manner in which the base is thus held against the supporting wall that the space within the hollow base is completely enclosed and provides for the storage of the mixer accessories where they are out of the way of circulating dust and nevertheless readily available for immediate use.

The light plastic shell constructed to form the mixer supporting base as described above provides an easily handled container and carrier for the mixer accessories as well as providing a storage place for the complete mixer accessories immediately adjacent the work area where it is to be used. When it is desired to carry the mixer to another location the mounting base may be employed there as a support on a level table surface or the like. It is for the purpose of maintaining the mixer in position on the sloping surface of the front side or face of the mounting that the inter engaging arrangement of the leg 27 and opening 28 in the face is provided.

The arrangement of the base 10 so that it is of increasing cross section downwardly and provides a front face which slopes downwardly and away from the wall assures application of substantial pressure between the mixer and the base at the lower portion of the base and further facilitates the maintaining of good frictional contact between the flange 14 and the wall without requiring additional securing means between the base and the wall. Thus the single pivot screw 23 holding the top of the base is entirely sufficient for holding the storage base in position on the wall and at the same time provides the ready detachment to enable the base to be removed and its contents used with the same ease as that with which the mixer is detached from its single pivot support.

While the invention has been illustrated in connection with a specific construction and configuration of the base mounting other modifications and arrangements will occur to those skilled in the art.

I claim:
1. A wall mounting for an electric mixer unit or the like comprising a base member for mounting on a wall in engagement therewith, said member having a relatively flat front side and being of downwardly increasing cross section whereby said front side slopes downwardly and away from a wall on which it is mounted, means adjacent the top of said member for hanging said member on a wall in engagement with the wall and for ready removal therefrom, and means on the upper portion of said front side for removably hanging a mixer unit or the like thereon and outwardly spaced from the wall whereby a lower portion of the mixer will bear against a lower portion of said front side and the weight of the mixer will urge said member against the wall in firm frictional engagement.

2. A wall mounting for an electric mixer unit or the like as set forth in claim 1 wherein said base member is hollow and has its rear side open, and including means for mounting mixer accessories and the like within said hollow member.

3. A wall mounting for an electric mixer unit or the like as set forth in claim 2 wherein the side walls of said hollow member are provided with integral flat flange portions forming a continuous flange in a single plane for face engagement with a wall on which the member is hung whereby accessories or the like within said hollow member are shielded from circulating dust and the like.

4. A wall mounting for an electric mixer or the like as set forth in claim 3 wherein said hollow member comprises a light weight shell of plastic material molded to the configuration thereof and provided with retaining members molded on the inner face of said front side for receiving the shafts of beaters and the like.

5. A wall mounting for an electric mixer unit or the like as set forth in claim 2 wherein both of said hanging means provide single pivots affording lateral swinging movement of said base with respect to the wall and of the mixer unit with respect to said base.

6. A wall mounting for an electric mixer or the like as set forth in claim 5 including means on said front side and spaced from said mixer hanging pivot for engaging the mixer and preventing lateral pivoting thereof when the mixer rests against said front side whereby said base member may be employed as a stable mixer support when resting on a level surface.

References Cited

UNITED STATES PATENTS

| | | | |
|---|---|---|---|
| 2,842,418 | 7/1958 | Wassell | 312—209 |
| 3,064,951 | 11/1962 | Fillweber | 259—131 |
| 3,300,264 | 1/1967 | Daniels et al. | 206—16 |

CASMIR A. NUNBERG, Primary Examiner

U.S. Cl. X.R.

206—16; 248—309; 259—131